(12) United States Patent
Bhalla

(10) Patent No.: US 7,379,130 B1
(45) Date of Patent: May 27, 2008

(54) LCD WITH HETERO POLAR LIGHT GUIDE

(75) Inventor: Jagmohan Bhalla, Washington, DC (US)

(73) Assignee: Vitera LLC, Washington, DC (US)

( * ) Notice: Subject to any disclaimer, the term of this patent is extended or adjusted under 35 U.S.C. 154(b) by 0 days.

(21) Appl. No.: 11/866,846

(22) Filed: Oct. 3, 2007

(51) Int. Cl.
*G02F 1/13357* (2006.01)

(52) U.S. Cl. .......................................... 349/61; 349/74

(58) Field of Classification Search ................. 349/15, 349/61, 62, 73
See application file for complete search history.

(56) References Cited

U.S. PATENT DOCUMENTS

| | | | |
|---|---|---|---|
| 5,808,709 A | 9/1998 | Davis et al. ................... 349/65 |
| 5,894,361 A * | 4/1999 | Yamazaki et al. ............ 349/15 |
| 5,917,562 A | 6/1999 | Woodgate et al. ............ 349/15 |
| 5,982,540 A | 11/1999 | Koike et al. |
| 6,048,079 A | 4/2000 | Yoneyama et al. |
| 6,104,454 A | 8/2000 | Hiyama et al. |
| 6,124,971 A | 9/2000 | Ouderkirk et al. |
| 6,188,460 B1 | 2/2001 | Faris |
| 6,222,598 B1 | 4/2001 | Hiyama et al. |
| 6,234,639 B1 | 5/2001 | Noguchi |
| 6,243,068 B1 | 6/2001 | Evanicky et al. |
| 6,259,496 B1 | 7/2001 | Kashima |
| 6,262,842 B1 | 7/2001 | Ouderkirk et al. |
| 6,333,773 B1 | 12/2001 | Faris |
| 6,448,955 B1 | 9/2002 | Evanicky et al. |
| 6,486,997 B1 | 11/2002 | Bruzzone et al. |
| 6,515,785 B1 | 2/2003 | Cobb, Jr. et al. |
| 6,573,961 B2 | 6/2003 | Jiang et al. |
| 6,631,031 B2 | 10/2003 | Lee et al. |
| 6,688,751 B2 | 2/2004 | Lee et al. |
| 6,721,096 B2 | 4/2004 | Bruzzone et al. |
| 6,738,114 B1 | 5/2004 | Faris |
| 6,750,996 B2 | 6/2004 | Jagt et al. |
| 6,801,270 B2 | 10/2004 | Faris et al. |
| 6,829,071 B2 | 12/2004 | Allen et al. |
| 6,831,720 B2 | 12/2004 | Jiang et al. |

(Continued)

FOREIGN PATENT DOCUMENTS

EP          1655634 A1     5/2006

(Continued)

OTHER PUBLICATIONS

Adachi, M. et al. (2005). "34.4L: Late News-Paper: Light Out-Coupling Enhancement of OLEDs by a Polarized Light Recycling Structure," *SID Symposium Digest* 2005:1285-1287.

(Continued)

*Primary Examiner*—David Nelms
*Assistant Examiner*—Matthew P Lawson
(74) *Attorney, Agent, or Firm*—Womble Carlyle Sandridge & Rice, PLLC

(57) ABSTRACT

An electro-optical display includes a light source and a Polarization Separation Element ("PSE") coupled to the light source. The PSE generates a first output having a first polarization state and a second output having a second polarization state. The display further includes a Hetero Polar Light Guide ("HPLG") that includes a first region optically isolated from a second region and coupled to the PSE. The first output of the PSE is directed into the first region and the second output of the PSE is directed into the second region, and the first region and second region output light in substantially the same direction.

20 Claims, 5 Drawing Sheets

U.S. PATENT DOCUMENTS

| | | | |
|---|---|---|---|
| 6,833,891 B2 | 12/2004 | Jiang et al. | |
| 6,888,675 B2 | 5/2005 | Ouderkirk et al. | |
| 6,912,018 B2 | 6/2005 | Faris et al. | |
| 6,934,082 B2 | 8/2005 | Allen et al. | |
| 6,975,455 B1 | 12/2005 | Kotchick et al. | |
| 6,981,791 B2 | 1/2006 | Higashiyama | 362/600 |
| 7,038,745 B2 | 5/2006 | Weber et al. | |
| 7,072,544 B2 | 7/2006 | Cornelissen et al. | 385/31 |
| 7,201,510 B2 | 4/2007 | Yamashita et al. | |
| 7,220,038 B2 | 5/2007 | Yamashita et al. | |
| 2001/0028422 A1 | 10/2001 | Tsujimura et al. | |
| 2002/0003593 A1 | 1/2002 | Arakawa et al. | |
| 2002/0113921 A1 | 8/2002 | Jiang et al. | |
| 2002/0121848 A1 | 9/2002 | Lee et al. | |
| 2002/0176165 A1 | 11/2002 | Lee et al. | |
| 2003/0058383 A1 | 3/2003 | Jagt et al. | |
| 2003/0095400 A1 | 5/2003 | Kashima et al. | |
| 2003/0164906 A1 | 9/2003 | Arakawa et al. | |
| 2003/0164914 A1 | 9/2003 | Weber et al. | |
| 2004/0017675 A1 | 1/2004 | Yang | 362/19 |
| 2004/0105046 A1 | 6/2004 | Jiang et al. | |
| 2004/0263060 A1 | 12/2004 | Gilmour et al. | |
| 2005/0002098 A1 | 1/2005 | Allen et al. | |
| 2005/0007515 A1 | 1/2005 | Faris | |
| 2005/0024726 A1 | 2/2005 | Ouderkirk et al. | |
| 2005/0062906 A1 | 3/2005 | Ishizaki | |
| 2005/0219428 A1 | 10/2005 | Li et al. | |
| 2005/0270439 A1 | 12/2005 | Weber et al. | |
| 2006/0055844 A1 | 3/2006 | Mi | |
| 2006/0056196 A1 | 3/2006 | Masuda et al. | |
| 2006/0098140 A1 | 5/2006 | Lee | |
| 2006/0109398 A1 | 5/2006 | Mi | |
| 2006/0187650 A1 | 8/2006 | Epstein et al. | |
| 2007/0014127 A1 | 1/2007 | Hara et al. | |
| 2007/0052882 A1* | 3/2007 | Hwang et al. | 349/62 |
| 2007/0064445 A1 | 3/2007 | Hatanaka et al. | 362/613 |
| 2007/0081319 A1 | 4/2007 | Fang et al. | |
| 2007/0127260 A1 | 6/2007 | Lee et al. | |

FOREIGN PATENT DOCUMENTS

| | | |
|---|---|---|
| JP | 4-184429 A | 7/1992 |
| JP | 6-95111 A | 4/1994 |
| JP | 6-265892 A | 9/1994 |
| JP | 9-326205 A | 12/1997 |
| JP | 10-96915 A | 4/1998 |
| WO | WO-98/11275 A1 | 3/1998 |
| WO | WO-99/34246 A1 | 7/1999 |
| WO | WO-99/59005 A1 | 11/1999 |
| WO | WO-00/70400 A1 | 11/2000 |
| WO | WO-2005/029168 A1 | 3/2005 |
| WO | WO-2006/055469 A2 | 5/2006 |

OTHER PUBLICATIONS

Demke, K.R. et al.(Mar. 1988). Method to Improve the Perceived Quality of Liquid Crystal Displays, IBM Technical Disclosure Bulletin, pp. 55-58.

Hochbaum, A. et al. (1999). "Cholesteric Color Filters: Optical Characteristics, Light Recycling, and Brightness Enhancement," *SID Symposium Digest* 1999:1063-1065.

Howard, W. E. et al.(May 1997). Apparatus Configuration and Liquid Crystal Display Operating Mode Having HIgh Transmission and High Contrast Ratio for Projection Display Application, IBM Technical Disclosure Bulletin, pp. 1-6.

Jagt, H. J. B. et al. (2002). "Linearly Polarized Light-emitting Backlight," *J. Soc. Inf. Display* 10(1):107-112.

Jagt, H. J. B. et al. (2002). "Micro-structured Polymeric Linearly Polarized Light Emitting Lightguide for LCD Illumination," *SID Symposium Digest* 2000:1236-1239.

Kubota, H. et al. (2002). "Simulation Study of Light Emission of a Backlight System with a Broad Band Cholesteric Liquid Crystal Polarizer," *SID Symposium Digest* 2002:333-335.

Mi, X. et al. (2005). "Low Fill-Factor Wire Grid Polarizers for LCD Backlighting," *SID Symposium Digest* 2005:1004-1007.

Mogi, M. et al. (Feb. 1995). Liquid Crystal Display Backlight with Polarization, IBM Technical Disclosure Bulletin, pp. 533-536.

Pang, Z. et al. (1999). "Novel High Efficiency Polarizing Backlight System With A Polarizing Beam Splitter," *SID Symposium Digest* 1999:2-5.

Suzuki, M. et al. (1999). "Two Approaches to the Luminance Enhancement of Backlighting Units for LCDs" *J. Soc. Inf. Display* 7(3):157-161.

Suzuki, M. et al. (Jun. 1990). "Polarized Backlight for Liquid Crystal Display," IBM Technical Disclosure Bulletin, pp. 143-144.

Tanase, H. et al. (1998). "A New Backlighting System Using a Polarizing Light Pipe," *IBM J. Res. Develop.* 42(3/4):527-536.

Yang, X. et al. (2005). "Polarized Light-guide Plate for Liquid Crystal Display," *Optics Express* 13(21):8349-8356.

Zhu, X. et al. (2005). "Transflective Liquid Crystal Displays," *IEEE/OSA Journal of Display Technology* 1(1):15-29.

\* cited by examiner

LCD WITH HETERO POLAR LIGHT GUIDE

FIELD OF THE INVENTION

One embodiment of the present invention is directed to a liquid crystal display. More particularly, one embodiment of the present invention is directed to a liquid crystal display having a hetero polar light guide.

BACKGROUND INFORMATION

A liquid crystal display ("LCD") is a thin, flat display device made up of any number of color or monochrome pixels arrayed in front of a light source or reflector. It has many advantages over competing technologies because it uses very small amounts of electric power and is therefore suitable for use in battery-powered electronic devices, and because of its thinness.

Each pixel in an LCD consists of a layer of liquid crystal ("LC") molecules suspended between two transparent electrodes, and sandwiched between two crossed linear polarizers (i.e., polarizers with axes of transmission which are perpendicular to each other). Without the liquid crystals between them, light passing through one polarizer would be blocked by the other. The liquid crystals act as polarization modifying light valves by changing the polarization state of the light coming from the rear polarizer. In order to function in this manner, the liquid crystal molecules must be correctly aligned so that they accept light of the polarization state transmitted by the rear polarizer and can rotate it to the polarization state that is transmitted by the front polarizer. Various techniques are known for achieving the appropriate alignment of the liquid crystal molecules. These include mechanical rubbing, which introduces microscopic grooves, or use of oriented linearly polarized UV illumination of an appropriate alignment layer substrate. Application of an electric field, by applying a voltage to the transparent electrodes, can modify the degree of polarization rotation, thus enabling fine control of the light passing through the pixel. The operation of LCDs depends on the correct relationship between the axis of transmission of the rear polarizer, the alignment of the liquid crystal layer (both for light entering and leaving) and the axis of transmission of the front polarizer.

The pixels by themselves do not generate light and therefore an LCD requires external illumination, either from ambient sources for a "reflective" LCD or from a backlight for a "transmissive" LCD (or from a combination in the case of a "transflective" LCD). A typical transmissive LCD has a backlight unit that consists of a light source and a light guide. The light guide is used to transform the light output by the light source into an even distribution across the LCD panel (typically the light enters the light guide and is constrained to continue propagating within it by total internal reflection, until it encounters an extraction feature). A large portion of the power consumption of a transmissive LCD is devoted to the backlight. However one problem with known transmissive LCDs is that the majority of this power is expended in producing light that is ultimately not used in the display output, since it is filtered out. A typical light yield (i.e., the fraction of generated light that is transmitted by a fully active pixel) of these known LCDs is approximately 5%-7%.

Light loss that is intrinsic to LCD designs is typically due to the following elements (assuming illumination from an unpolarized white source):

color filter set: approximately 28% transmission;
aperture ratio: approximately 70% transmission; and
rear and front polarizers: approximately 40% transmission.

Color filters are required since backlights typically generate white light. The aperture ratio arises since some of the area of an LCD does not transmit light.

Polarization losses arise from intrinsic aspects of the design of LCDs. As has been described, LCDs require illumination to be linearly polarized and appropriately oriented, which typically results in the loss of at least half of the light available from the backlight.

Various attempts have been made to improve the light yield of LCDs, which could greatly improve the electrical efficiency of LCDs, therefore enabling more power efficient appliances, extending battery life for mobile devices, reducing needed backlight illumination components since fewer or lower power lamp elements would be needed to provide a certain level of brightness, and improving heat management in display units since much of the lost light is absorbed as heat.

One known prior art approach for improving light yield involves the use of a Polarization Separation Element ("PSE") and a Polarization Conversion Element ("PCE"). For example U.S. Pat. No. 7,038,745 discloses the use of a reflective rear polarizer, which transmits a first polarization state and reflects a second polarization state, as a PSE and a Lambertian rear reflector in the backlight unit as a PCE. The Lambertian rear reflector depolarizes the second polarization to include some portion of the first polarization state, which can then be transmitted by the reflective rear polarizer, thereby improving light yield. In this disclosed approach, the polarization separation occurs after unpolarized light has been extracted from the light guide by frustrated total internal reflection. Commercial versions of this technology are in use and though it represents an improvement over previous approaches, a significant portion of the output of the light source is still not utilized.

Another known approach for improving light yield is disclosed, for example, in U.S. Pat. Application 2007/0064445, which discloses the use of a polarization beam splitter ("PBS") between the light source and the light guide as a PSE where the non transmitted output from the PBS is directed to a wave plate that operates as a PCE, the output of which feeds into the light guide. In this approach, polarization separation occurs before light enters the light guide. One problem with this approach is the efficiency of conversion of the PCE and its variation of performance by incident angle and wavelength, which leaves a portion of the output of the light source not utilized.

A further prior art approach is disclosed in U.S. Pat. No. 6,234,639 which discloses polarization selective out-coupling as a PSE and a quarter-wave plate and reflector as a PCE. Unpolarized light is coupled into a light guide which has polarization selective out-coupling based on reflection at a series of inclined surfaces within the light guide, which have appropriately tuned variations in refractive indices. These features selectively extract a first polarization state and continue the Total Internal Reflection ("TIR") propagation of a second polarization state, which eventually encounters the PCE, where some is converted to the extractable polarization state. As disclosed, polarization separation occurs in the light guide during the process of extraction. Again the efficiency of the conversion process leaves a portion of the output of the light source not utilized.

Several other polarization selective out-coupling techniques are known and have been applied to light guides. For example, U.S. Pat. No. 6,796,669 discloses the use of inclined reflective films; U.S. Pat. No. 6,750,996 discloses the use of a volume hologram, which is equivalent to a stack of inclined planes with varying refractive indices; U.S. Pat. No. 7,072,544 discloses the use of Polymer Dispersed Liquid Crystal ("PDLC") where the dispersed phase has anisotropic refractive indices; and U.S. Pat. App. 2003/0058383 discloses the use of a birefringent micro-structured layer. Some of these polarization selective out-coupling approaches benefit from extracting light in a confined range of directions, which can be useful in minimizing the need for prism films or other output collimation structures.

Based on the foregoing, there is a need for an LCD system that has an improved light yield relative to known systems.

SUMMARY OF THE INVENTION

One embodiment is an electro-optical display that includes a light source and a Polarization Separation Element ("PSE") coupled to the light source. The PSE generates a first output having a first polarization state and a second output having a second polarization state. The display further includes a Hetero Polar Light Guide ("HPLG") that includes a first region optically isolated from a second region and coupled to the PSE. The first output of the PSE is directed into the first region and the second output of the PSE is directed into the second region, and the first region and second region output light in substantially the same direction.

DETAILED DESCRIPTION

One embodiment is an electro-optical device with a hetero polar light guide ("HPLG") operating by polarization selective in-coupling. In one embodiment, a HPLG is a light guide that outputs light from different regions, in the same direction, with different polarization characteristics. In contrast, most known light guides are homo polar because they output light with substantially the same polarization characteristics over the whole of their output faces.

Figure 1:
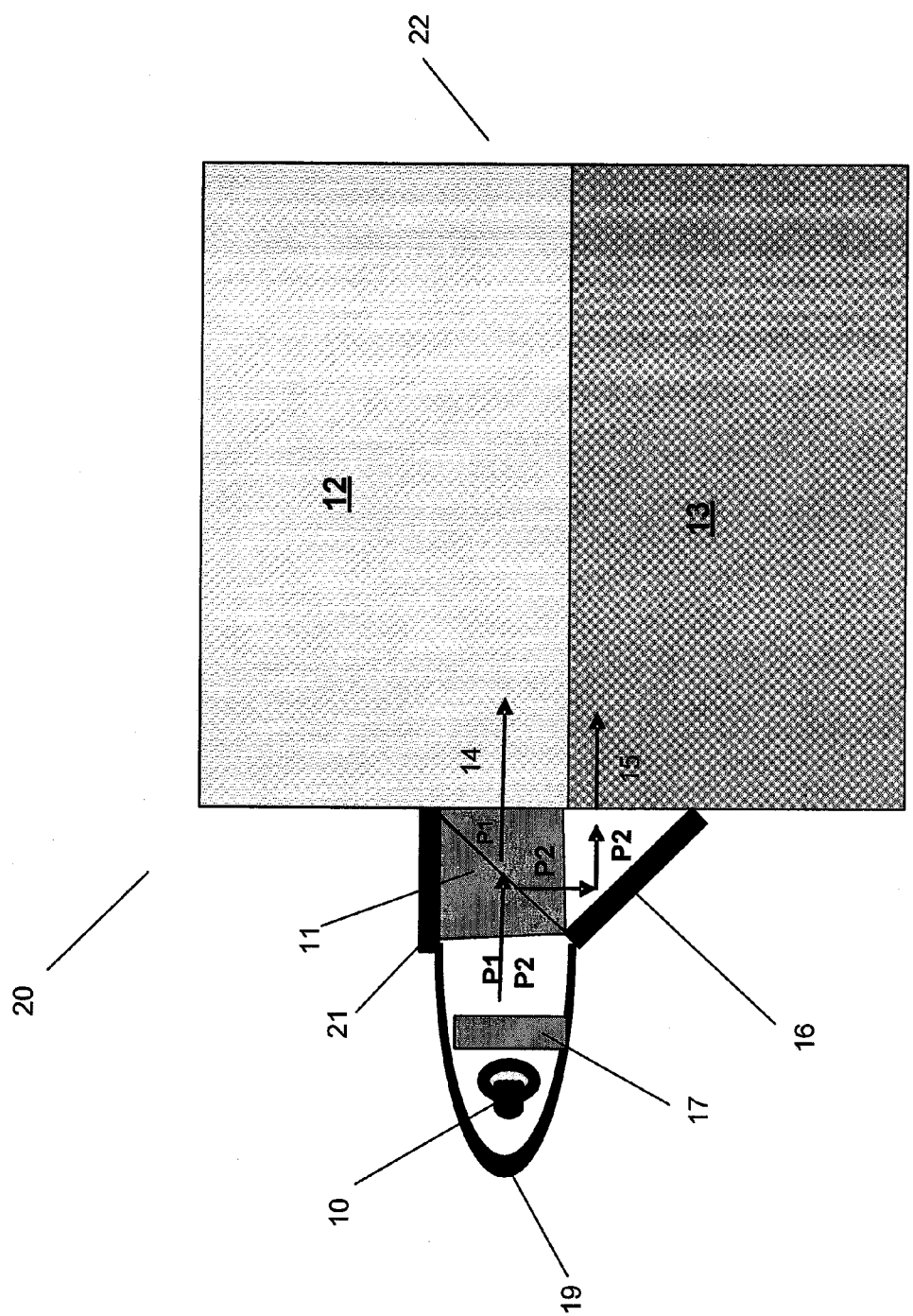
FIG. 1 is a plan view of a direct view LCD Backlight Unit ("BU") that includes an HPLG in accordance with one embodiment of the present invention.

FIG. 1 is a plan view of a direct view LCD Backlight Unit ("BU") 20 that includes an HPLG 22 in accordance with one embodiment of the present invention. FIG. 1 illustrates only those elements directly involved in one embodiment, and does not illustrate other elements that may be used in an LCD device (e.g., color filter elements, prism sheets, alignment layers, diffusers, other polarizing elements, other reflecting elements, etc). A light source 10 generates light which is optically coupled to the input of a Polarization Separation Element ("PSE") 11. In one embodiment, light source 10 is a light emitting diode ("LED") and PSE 11 is a Polarizing Beam Splitter Cube. PSE 11 generates two outputs 14 and 15, which are predominantly of a single polarization state, "P1" and "P2" respectively, each of which is different from the other. One of these polarization state outputs 14 is transmitted into one region 12 of HPLG 22. The other output 15 is directed by a reflector 16 to another region 13 of HPLG 22. In one embodiment, HPLG regions 12 and 13 are optically isolated, such that light can not pass between them. The interface between regions 12 and 13 can be mirrored or otherwise modified to ensure no cross leakage. Other reflectors 19 and 21 also reflect the light.

Figure 5:
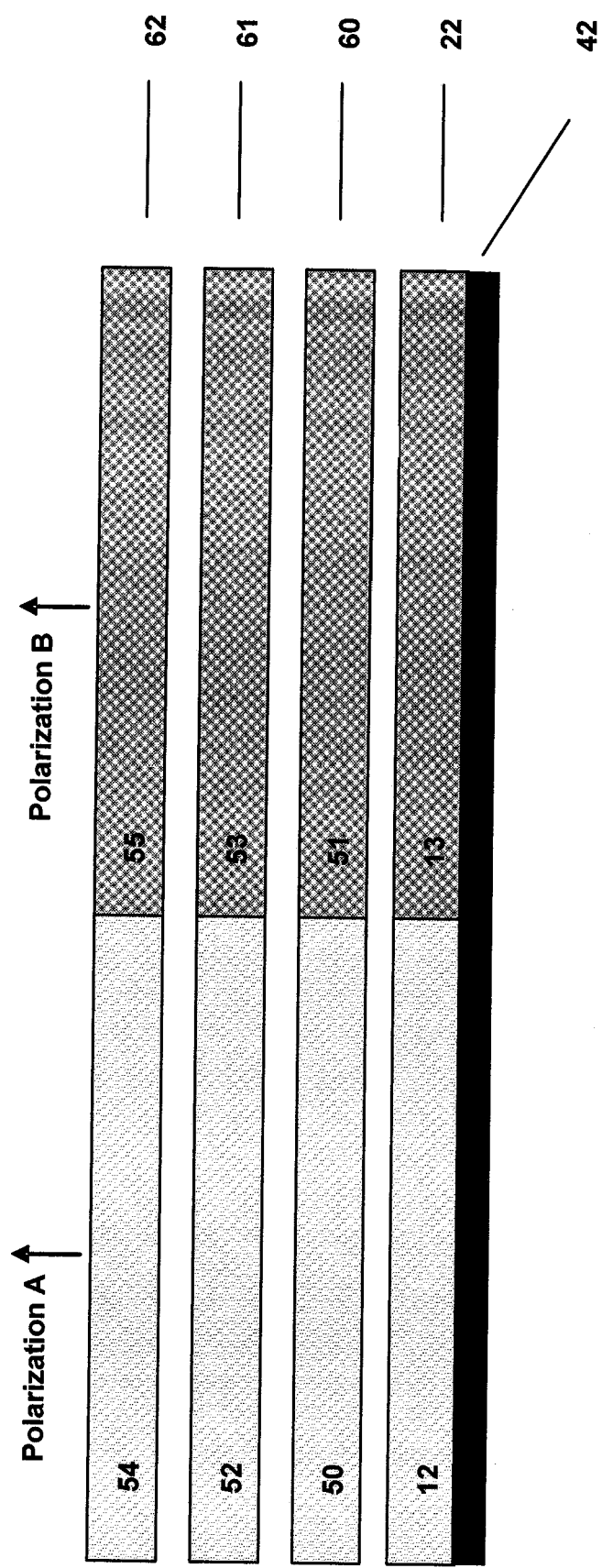
FIG. 5 is a cross-sectional view of a direct view Hetero Polar Liquid Crystal Display (HPLCD) which uses a HPLG in accordance with one embodiment.

Each region 12, 13 of HPLG 22 operates as an otherwise conventional light guide and can use conventional techniques for homogenization and extraction to provide uniform illumination to the output face. Extraction from each region of the light guide is best achieved in a non polarization modifying (i.e., specular) manner. Specular extraction techniques are known and are commercially available, such as micro-prism light guides from Global Lighting Technologies, Inc. In one embodiment, in order for an LCD to use HPLG 22, the output faces of the HPLG 22 are matched to appropriately oriented regions of a Hetero Polar LCD ("HPLCD"), which is shown in FIG. 5 below. In one embodiment, an HPLCD is an LCD that uses more than one polarization of light to form its output image. Therefore, the rear polarizer, LC layer and front polarizer of the HPLCD all have regions of substantially the same size and shape as the HPLG regions, each of which have polarization axes that are appropriately aligned. This embodiment enables most of both polarizations of light to be used to create the displayed image.

The performance of the embodiment of FIG. 1 depends substantially on the efficiency of PSE 11. Very high efficiency PSEs are known which can achieve high transmission and reflection efficiencies above 95%. However, to achieve these levels of efficiencies, the angle of incidence of light on these PSEs often needs to be controlled to be within a small range. In one embodiment, a collimator 17, such as a lens system or prism film, can be used between light source 10 and PSE 11 to further improve performance.

A key characteristic of a PSE is its contrast ratio or "extinction" ratio, which describes the respective amounts of each polarization state in each output. Embodiments of the present invention can utilize either high or low contrast ratio PSEs. In embodiments in which a high contrast ratio PSE is used (e.g., above 500:1), further performance benefits can be achieved by not requiring a rear polarizer for the LCD and therefore avoiding the associated losses. In embodiments in which a low contrast ratio PSE is used, conventional polarization recycling techniques within each region of HPLG 22 (e.g. using a reflective rear polarizer) can be used to convert some of the otherwise unusable component to a usable polarization state.

Some PSE's produce different quantities of light in each output. Since uniformity of illumination is important in LCDs, this difference should be compensated for. One method of achieving this compensation is by adjusting the relative size of the P1 and P2 emitting regions 12 and 13. Varying the relative size of P1 and P2 emitting regions can also be used to accommodate light sources that produce light with a polarization bias, which would result in different quantities of light in each PSE output. A further possible adjustment is to take account of boundary effects close to where adjacent regions meet. The distribution of extraction features can be adjusted to ensure as uniform a distribution of output light intensity as possible. Embodiments are not limited to any particular light source, or PSE or light guide material or light guide shape.

Figure 2:
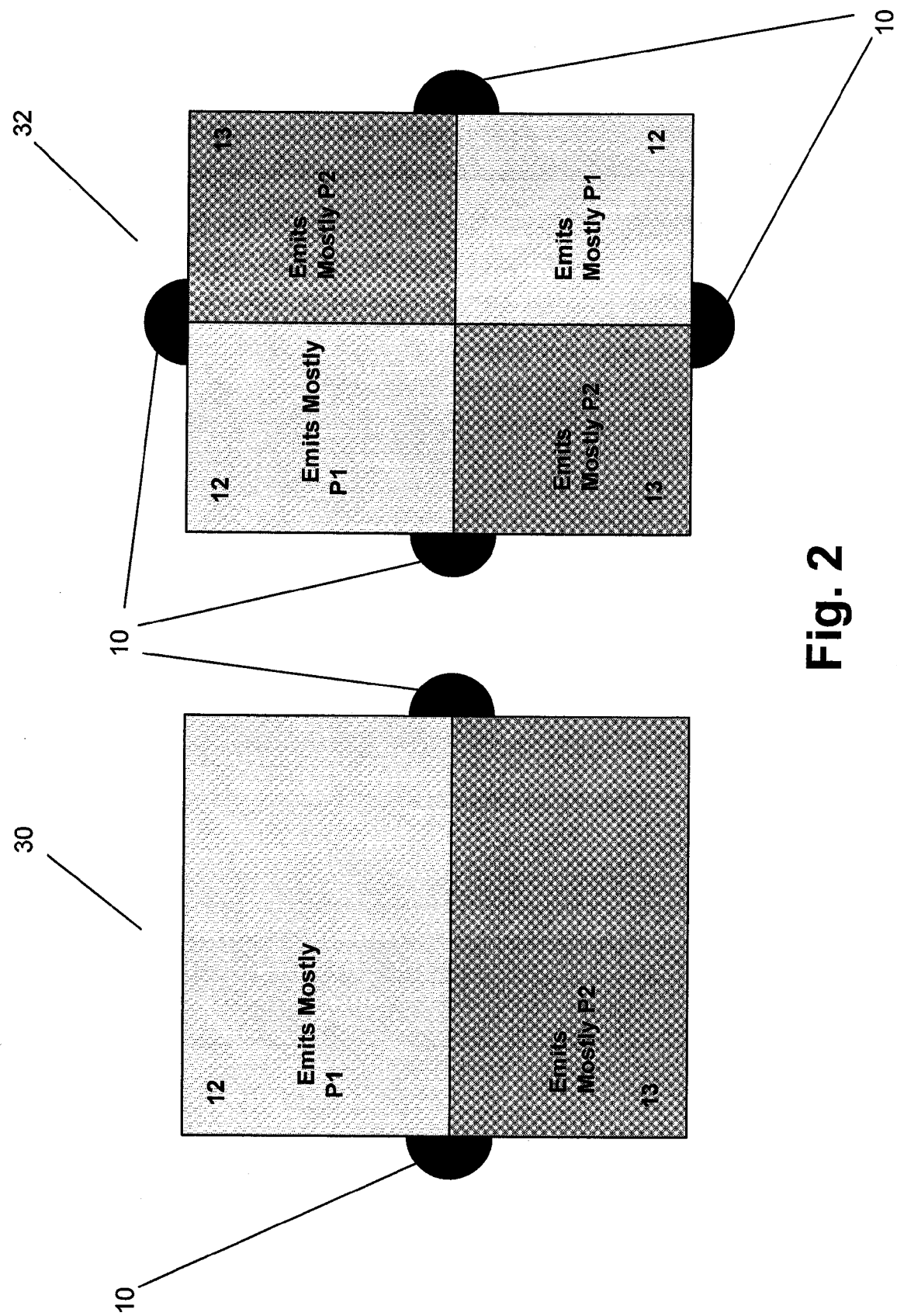
FIG. 2 are plan views of direct view LCD Backlight Units that include an HPLG for polarization selective in-coupling with multiple light sources in accordance with one embodiment.

FIG. 2 are plan views of direct view LCD Backlight Units 30 and 32 that include an HPLG for polarization selective in-coupling with multiple light sources in accordance with one embodiment. Other possible embodiments with multiple light sources could use red, green and blue LEDs. These could be used either separately, with each LED having its own PSE, or in combination such that more than one LED shares a PSE.

Figure 3:
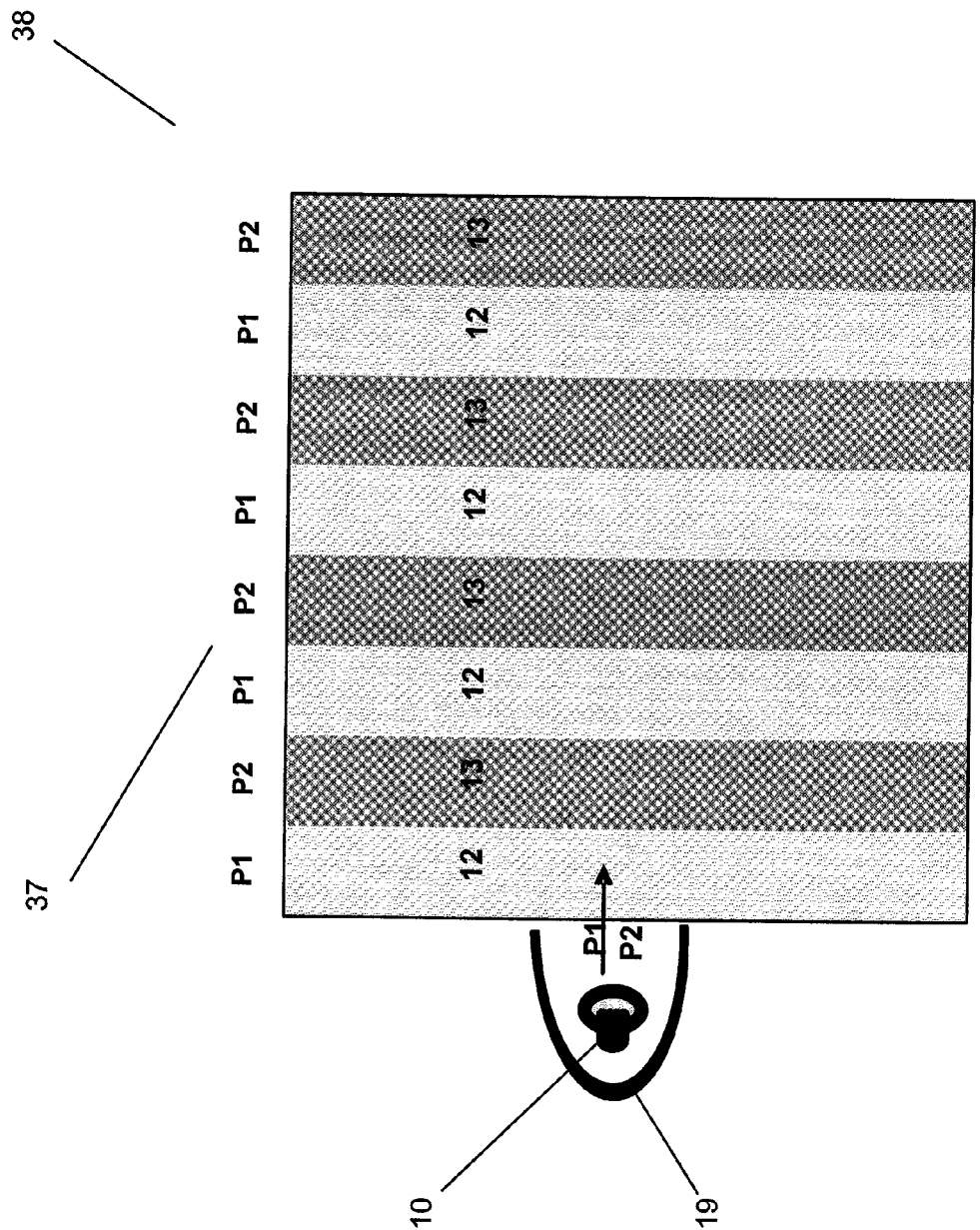
FIG. 3 is a plan view of a direct view LCD with a HPLG in accordance to one embodiment using polarization selective out-coupling.

FIG. 3 is a plan view of a direct view LCD Backlight Unit 38 that includes a HPLG which operates by polarization selective out-coupling. FIG. 3 illustrates only those elements directly involved in one embodiment, and does not show other elements that can be used in combination (e.g., color filter elements, prism sheets, alignment layers, diffusers, other polarizing elements, other reflecting elements, etc). Light source 10 generates light which is conventionally coupled into the HPLG. The HPLG has regions 12 and 13, where region 12 is capable of polarization selective out-coupling that extracts a first polarization state P1 and region 13 is capable of polarization selective out-coupling that extracts a second polarization state P2. Light from the source will propagate by total internal reflection through the HPLG until it encounters an out-coupling feature. There the majority of one polarization state will be selectively extracted while the majority of the other polarization state continues to propagate through the HPLG. This continuing component, which is primarily the other polarization state, propagates and reflects until it encounters another extraction feature.

Propagation of rays through the HPLG can be considered to fall into two categories for the purpose of this disclosure. The first category are rays that encounter two extraction features without an intervening reflection from the rear or side reflectors, where the first extraction feature is in a different region to the second extraction feature. Rays in this first category will have a substantial majority of their light extracted such that it can be used to form the display image, since for example the first feature will extract most of light of a first polarization state and the second feature will extract most of the light of the second polarization state. The second category of rays have at least one reflection from the rear reflector or side reflectors between encountering extraction features. The overall extraction characteristic of these rays depends on whether reflection at the rear or side reflectors is specular or whether there is depolarization. If the reflections are specular, rays will propagate until they encounter an extraction feature in an appropriate region. Such rays may require a longer path, since only half the HPLG has the matched extraction orientation, which could lead to greater energy losses. On the other hand, if the reflectors depolarize upon reflection, 50% of the reflected rays can be extracted by the first extraction feature they encounter regardless of which region it is in. This on average could lead to shorter paths with fewer reflections to extraction and hence lower energy losses. Rays in this second category are essentially analogous to rays in conventional polarization recycling. One example of how to maximize the number of rays in the first category would be to use a grid pattern of alternating regions rather than a linear array of stripes.

Figure 4:
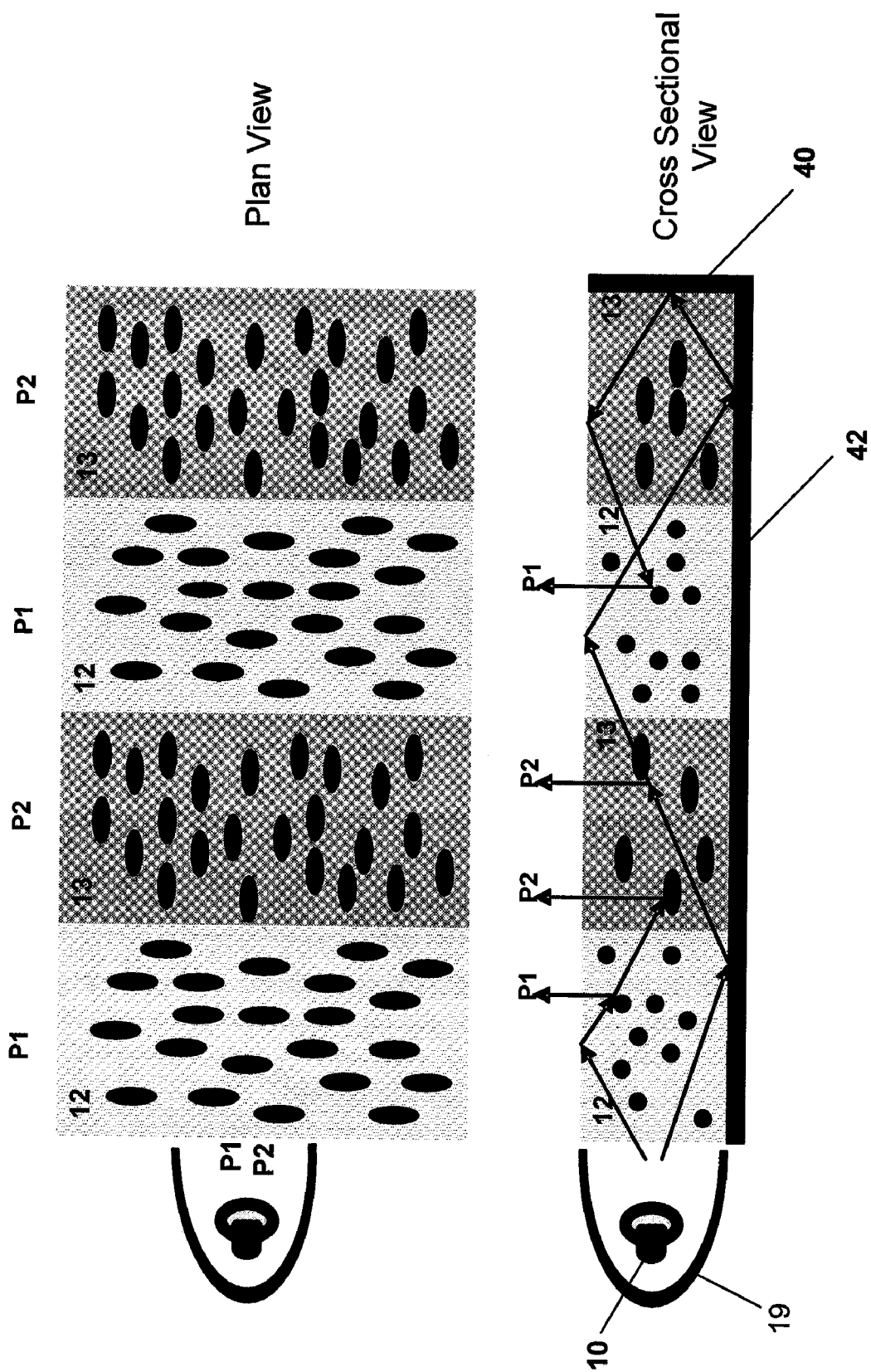
FIG. 4 is a plan and cross-sectional view of a HPLG with anisotropic PDLC polarization selective out-coupling.

Several polarization selective out-coupling techniques are known and the present invention is not limited to any particular approach. FIG. 4 is a plan and cross sectional view of a direct view LCD Backlight unit with a HPLG in accordance to one embodiment that uses an anisotropic Polymer Dispersed Liquid Crystal ("PDLC") layer as disclosed in, for example, U.S. Pat. No. 7,072,544. Anisotropic refractive index differences between elements of an oriented dispersed phase are used to achieve selective polarization extraction. For use in embodiments of the present invention, the orientations are modified in adjacent regions to alter the relative orientation of the disperse phase, as shown in FIG. 4. Such alternating orientations can be achieved by physically cutting and joining together appropriately shaped elements of a single orientation PDLC sheet. Alternatively U.S. Pat. No. 7,072,544 discloses other examples of achieving PDLC orientation and any of these can be adapted for use with the present invention. For example the patterned orientations required for the present invention could be manufactured by using appropriately patterned electrical or magnetic fields. U.S. Pat. No. 7,072,544 discloses that the disperse phase need not extend throughout the LG (e.g., it can be a thin layer on either the top or bottom of the LG). Any other known polarization selective out-coupling techniques can be used with embodiments of the present invention.

FIG. 5 is a cross-sectional view of a direct view HPLCD which uses a HPLG in accordance with one embodiment. FIG. 5 illustrates only those elements directly involved in one embodiment, and does not illustrate other elements that may be used in an LCD device (e.g., color filter elements, prism sheets, alignment layers, diffusers, other polarizing elements, other reflecting elements, etc). Rear polarizer 60, LC layer 61 and front polarizer 62 of the HPLCD all have regions of substantially the same size and shape as their corresponding HPLG regions. For example region 50 of the rear polarizer, region 52 of the LC layer and region 54 of the front polarizer are substantially the same size and shape as region 12 of the HPLG. Further, region 51 of the rear polarizer, region 53 of the LC layer and region 55 of the front polarizer are substantially the same shape and size as region 13 of the HPLG. Regions 12, 50, 52 and 54 have polarization axes oriented to enable them to operate as an LCD display that produces an output of polarization A. Similarly regions 13, 51, 53 and 55 have polarization axes oriented to enable them to operate as an LCD display that produces an output of polarization B. In one embodiment, polarization A is orthogonal to polarization B. In one embodiment rear reflector 42 is specular.

The heterogeneous regions 12 and 13 of the HPLG can be of any shape or size that is convenient to manufacture. In one embodiment, the aggregate area of each orientation covers approximately 50% of the total area. In other embodiments, the shape and layout of heterogeneous regions can be optimized to take advantage of the properties of elements of the backlight unit and to optimize evenness of illumination.

In one embodiment, to enable an LCD to use the disclosed HPLG, the output face of the HPLG has regions that are matched to appropriately oriented regions of a HPLCD (not shown). Therefore, the rear polarizer, LC layer and front polarizer all have regions of substantially the same size and shape as the HPLG regions, each of which have polarization axes that are appropriately aligned. In the event that the contrast ratio of the polarization selective out-coupling is high enough it would be possible to have a HPLCD without a rear polarizer. Embodiments are not limited to any particular light source, or polarization selective out-coupling technique or light guide material or light guide shape.

Other components typically used in LCDs and backlights, such as color filters, diffusers, compensating films, prism sheets, collimating sheets etc., may also be used in conjunction with embodiments of the present invention. Any of these additional elements that require a matched polarization orientation should also have appropriate heterogeneous regions.

Heterogeneous polarizers that are used in embodiments of the present invention are known. For example, in the specialized area of 3D stereoscopic displays, heterogeneously polarized output is used to encode and present different images to the right and left eyes of observers, which are then decoded by using suitable complementary polarized eye glasses. In these known systems, a heterogeneously polarized output is used to deliver different perspectives to the left and right eyes of observers by adding a patterned polarizing layer to the front of an otherwise conventional electro-optical display. These systems typically use either a micro-polarized array that is alternating for adjacent pixels or narrow strips of the display or alternating phase retarder regions to give distinctly circularly polarized views to each eye. However, these known systems do not include an HPLG.

Prior art polarization recovery techniques have relied on homogenously polarized LCDs, which can use a PSE and PCE to convert some portion of the previously unused polarization state to the useable state. In contrast, embodiments of the present invention do not necessarily require a PCE and therefore, embodiments of the present invention are not limited by the efficiency of the conversion process. This enables minimization of polarization losses, which can improve power efficiency and panel brightness.

Patterned alignment regions in LCD panels and methods of manufacturing them are known. For example multi-domain pixels have been designed to improve contrast and viewing angles in which the pixels are divided into more than one domain, each of which has different alignment directions, although all are homogenously polarized. Known manufacturing methods for creating these differently aligned domains are used in one embodiment to manufacture the patterned alignment regions of the LC layers.

In one embodiment, regions of the HPLG and HPLCD patterns should be designed so that interfaces between adjacent regions of heterogeneous polarization are not visible. To achieve this, in one embodiment boundaries can be arranged to be in areas of the panel that are between pixel elements of the display.

Embodiments of the present invention can be implemented for any electro-optical device using a light intensity modulation unit that depends on polarized illumination to work. These light intensity modulation units can be pixilated (i.e., have a regular array of pixels of the same shape and size), or they can have other patterns, where the elements are of different shapes and sizes, such as a "seven segment" display as commonly used in watches. The light intensity modulation unit can be of any type, including liquid crystal, such as Twisted Nematic, Super Twisted Nematic or non Nematic liquid crystal.

The present invention can be utilized with black and white displays, color displays and 3D displays. It can be utilized with any backlight source technology, including Cold Cathode Fluorescent Lamps ("CCFL"), electroluminescent, Light Emitting Diodes ("LED") or laser. For backlights with LEDs, embodiments of the present invention provide particular advantages for manufacturers of displays since the number of lamp units can be reduced, enabling LED backlights to compete for larger display segments. LEDs are also particularly suited for use in polarization selective in-coupling embodiments since they are a small source, which require small PSEs which lowers cost. LEDs also lend themselves to easier and cheaper collimation and hence better PSE performance. This also applies to laser light sources.

Further, embodiments of the present invention can compliment other known methods of improving efficiency, such as color display schemes that incorporate a white sub pixel (disclosed, for example, in U.S. Pat. No. 6,989,876) and field sequence color filterless displays which use multiple monochromatic primary color strobed light sources to avoid losses from color filters (disclosed, for example, in U.S. Pat. No. 6,480,247). Such displays still suffer from large polarization losses and hence can benefit from embodiments of the present invention.

Embodiments of the present invention are not limited to any particular light guide material or shape (e.g. can be implemented for slab guides, wedge guides or film guides).

Embodiments of the present invention are not limited to edge lit back light units. Embodiments of the present invention are not limited to use in Liquid Crystal Displays but can be used for other applications.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. An electro-optical system comprising:
    a light source;
    a Hetero Polar Light Guide (HPLG) coupled to the light source and having a first region and a second region, wherein the first region outputs a first light substantially comprising a first polarization state, and the second region outputs a second light substantially comprising a second polarization state, wherein the first light and the second light is output in approximately the same direction and the first polarization state is different than the second polarization state; and
    a polarization modifying light intensity modulation layer coupled to the hetero polar light guide having a third region and a fourth region; wherein the third region accepts polarized light aligned in a first direction and the fourth region accepts polarized light aligned in a second direction; and the third region is substantially aligned with and approximately the same shape and size as the first region, and said fourth region is substantially aligned with and approximately the same shape and size as the second region.

2. The electro-optical system of claim 1, further comprising:
    a Polarization Separation Element (PSE) coupled to the light source, the PSE adapted to receive light from the light source and generate a first output substantially comprising the first polarization state and a second output substantially comprising the second polarization state;
    wherein the first output is optically coupled to the first region of the HPLG, and the second output is optically coupled to the second region of the HPLG, and the first and second regions of the HPLG are optically isolated to substantially prevent light from traveling between the first and second regions.

3. The electro-optical system of claim 1, wherein the polarization modifying light intensity modulation layer comprises a Liquid Crystal layer.

4. The electro-optical system of claim 2, further comprising a collimator coupled to the light source and adapted to deliver collimated light to the PSE.

5. The electro-optical system of claim 4 wherein the collimator comprises a lens system.

6. The electro-optical system of claim 1, further comprising:
- a heterogeneous front polarizer coupled to the light intensity modulation layer and having a fifth region and a sixth region;
- wherein the fifth region is substantially aligned with and approximately the same size and shape as the first region and the sixth region is substantially aligned with and approximately the same size and shape as the second region.

7. The electro-optical system of claim 6, wherein the electro-optical system operates as a Hetero Polar Liquid Crystal Display (HPLCD).

8. The electro-optical system of claim 1, further comprising:
- a heterogeneous rear polarizer coupled to the light intensity modulation layer and having a seventh region and an eighth region;
- wherein the seventh region is substantially aligned with and approximately the same size and shape as the first region and the eighth region is substantially aligned with and approximately the same size and shape as the second region.

9. The electro-optical system of claim 8, wherein the heterogeneous rear polarizer is reflective and the seventh region transmits the first polarization state and reflects the second polarization state, and the eighth region transmits the second polarization state and reflects the first polarization state.

10. The electro-optical system of claim 6, further comprising:
- a heterogeneous rear polarizer coupled to the light intensity modulation layer and having a ninth region and an tenth region;
- wherein the ninth region is substantially aligned with and approximately the same size and shape as the first region, and the tenth region is substantially aligned with and approximately the same size and shape as the second region.

11. The electro-optical system of claim 10, wherein the heterogeneous rear polarizer is reflective and the ninth region transmits the first polarization state and reflects the second polarization state, and the tenth region transmits the second polarization state and reflects the first polarization state.

12. The electro-optical system of claim 10, wherein the electro-optical system operates as a Hetero Polar Liquid Crystal Display (HPLCD).

13. The electro-optical system of claim 1, wherein the first polarization state is orthogonal to the second polarization state and the first direction is orthogonal to the second direction.

14. The electro-optical system of claim 1, wherein the first region selectively extracts by out-coupling the first polarization state; and
the second region selectively extracts by out-coupling the second polarization.

15. The electro-optical system of claim 14, wherein the polarization selective out-coupling comprises an anisotropic polymer dispersed liquid crystal (PDLC) layer.

16. A method of operating an electro-optical display device comprising:
generating light;
coupling the light to a Hetero Polar Light Guide (HPLG) having a first region and a second region, wherein the first and second regions of the HPLG are optically isolated to substantially prevent light from traveling between the regions;
enabling the first region to output light of substantially a first polarization state and the second region to output light of substantially a second polarization state that is different from the first polarization state, wherein light of both first and second polarization states is output in substantially a same direction; and
coupling the light from the HPLG to a Liquid Crystal (LC) light intensity modulation layer having a third region and a fourth region and liquid crystal molecules;
wherein the third region molecules are aligned in a first direction and the fourth region molecules are aligned in a second direction; and
the third region is substantially aligned with and approximately the same shape and size as the first region, and the fourth region is substantially aligned with and approximately the same shape and size as the second region; and
coupling an output from the LC light intensity modulation layer to a heterogeneous front polarizer having a fifth region and a sixth region, wherein the fifth region is substantially aligned with and approximately the same size and shape as the first region, and the sixth region is substantially aligned with and approximately the same size and shape as the second region.

17. The method of claim 16, further comprising:
coupling the light to a Polarization Separation Element (PSE) that produces a first output having the substantially first polarization state and a second output having the substantially second polarization state;
wherein the first output is optically coupled to the first region of the HPLG and the second output is optically coupled to the second region of the HPLG.

18. The method of claim 16, further comprising:
a heterogeneous rear polarizer having a ninth region and an tenth region;
wherein the ninth region is substantially aligned with and approximately the same size and shape as the first region; and
the tenth region is substantially aligned with and approximately the same size and shape as the second region; and
light from the HPLG is coupled to the heterogeneous rear polarizer, which outputs light to the LC light intensity modulation layer.

19. The method of claim 16, wherein the first region selectively out-couples the first polarization state light and the second region selectively out-couples the second polarization state light.

20. A liquid crystal display (LCD) comprising:
a light source;
a Polarization Separation Element (PSE) coupled to the light source and adapted to generate a first output having a first polarization state and a second output having a second polarization state; and
an Hetero Polar Light Guide (HPLG) coupled to the PSE and comprising a first region optically isolated from a second region;
wherein the first output is directed into the first region and the second output is directed into the second region, and the first region and second region output light in substantially the same direction.

* * * * *